(12) United States Patent
Kim et al.

(10) Patent No.: US 8,547,761 B2
(45) Date of Patent: Oct. 1, 2013

(54) MEMORY MODULE AND MEMORY SYSTEM COMPRISING MEMORY MODULE

(75) Inventors: Seok-Il Kim, Hwaseong-si (KR); You-Keun Han, Yongin-si (KR); Jung-Joon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 399 days.

(21) Appl. No.: 12/897,189

(22) Filed: Oct. 4, 2010

(65) Prior Publication Data
US 2011/0161576 A1 Jun. 30, 2011

(30) Foreign Application Priority Data

Dec. 29, 2009 (KR) .................. 10-2009-0133214

(51) Int. Cl.
*G11C 7/00* (2006.01)
(52) U.S. Cl.
USPC .................. 365/198; 365/191; 365/233.13

(58) Field of Classification Search
USPC ...................... 365/198, 191, 233.13
See application file for complete search history.

(56) References Cited

U.S. PATENT DOCUMENTS

| | | | |
|---|---|---|---|
| 2002/0144166 A1* | 10/2002 | Chang et al. ................. | 713/320 |
| 2003/0039151 A1* | 2/2003 | Matsui ........................ | 365/195 |
| 2003/0234664 A1 | 12/2003 | Yamagata | |
| 2008/0031073 A1* | 2/2008 | Brandt ........................ | 365/229 |
| 2009/0303802 A1* | 12/2009 | Lee ............................ | 365/189.05 |

FOREIGN PATENT DOCUMENTS

| | | |
|---|---|---|
| KR | 1020050001167 A | 1/2005 |
| KR | 1020060031109 A | 4/2006 |
| KR | 1020070036578 A | 4/2007 |

\* cited by examiner

*Primary Examiner* — Vu Le
*Assistant Examiner* — Han Yang
(74) *Attorney, Agent, or Firm* — Volentine & Whitt, PLLC (57) ABSTRACT

A memory module comprises a plurality of semiconductor memory devices each having a termination circuit for a command/address bus. The semiconductor memory devices are formed in a substrate of the memory module, and they operate in response to a command/address signal, a data signal, and a termination resistance control signal.

19 Claims, 10 Drawing Sheets

| OPERATION MODE | RTT of MOD1 | RTT of MOD2 | RTT of MOD3 | RTT of MOD4 |
|---|---|---|---|---|
| READ(MOD1) | OFF(INFINITE) | 120Ω | 120Ω | 120Ω |
| READ(MOD2) | 120Ω | OFF | 120Ω | 120Ω |
| READ(MOD3) | 120Ω | 120Ω | OFF | 120Ω |
| READ(MOD4) | 120Ω | 120Ω | 120Ω | OFF |
| WRITE(MOD1) | OFF(INFINITE) | 75Ω | 75Ω | 75Ω |
| WRITE(MOD2) | 75Ω | OFF | 75Ω | 75Ω |
| WRITE(MOD3) | 75Ω | 75Ω | OFF | 75Ω |
| WRITE(MOD4) | 75Ω | 75Ω | 75Ω | OFF |

MEMORY MODULE AND MEMORY SYSTEM COMPRISING MEMORY MODULE

CROSS-REFERENCE TO RELATED APPLICATIONS

This application claims priority under 35 U.S.C. §119 to Korean Patent Application No. 10-2009-0133214 filed on Dec. 29, 2009, the disclosure of which is hereby incorporated herein by reference in its entirety.

BACKGROUND

Embodiments of the inventive concept relate generally to electronic memory technologies. More particularly, embodiments of the inventive concept relate to memory modules having a termination circuit, and memory systems comprising such memory modules.

A semiconductor memory device transmits and receives data and control signals to and from a memory controller through a plurality of buses. As the speed of these transmissions increases, signal distortion can be introduced into the transmitted signals. Consequently, semiconductor memory devices typically incorporate a variety of features designed to reduce or eliminate signal distortion.

One form of signal distortion is signal reflection. Some semiconductor memory devices incorporate termination resistors to prevent reflection of signals transmitted from a memory controller to a semiconductor memory device.

SUMMARY

Embodiments of the inventive concept provide memory modules comprising semiconductor memory devices each having a termination circuit for a command/address bus. Some embodiments provide memory systems incorporating such memory modules.

These memory modules can provide relatively high performance and low error rate compared with certain conventional memory modules. In addition, these memory modules can improve the use of space on a substrate, allowing additional features such as capacitors to be mounted on the substrate to decrease power noise.

According to one embodiment of the inventive concept, a memory module comprises a substrate, and a plurality of semiconductor memory devices mounted on a surface of the substrate and configured to operate in response to a command/address signal, a data signal, and a termination resistance control signal. The memory module further comprises a command/address bus configured to transmit the command/address signal to the plurality of semiconductor memory devices, and a plurality of termination circuits formed in the respective semiconductor memory devices for termination of the command/address bus.

In certain embodiments, the command/address signal comprises packet data comprising a command signal and an address signal.

In certain embodiments, the command/address bus has a fly-by structure and electrically connects the semiconductor memory devices to each other.

In certain embodiments, one or more of the termination circuits is configured to change a termination resistance of the command/address bus in response to the termination resistance control signal.

In certain embodiments, one or more of the termination circuits comprises a termination resistor comprising a first terminal connected to the command/address bus, and a second terminal, and a first transistor coupled between the second terminal of the termination resistor and a termination voltage, the first transistor performing a switching operation in response to the termination resistance control signal.

In certain embodiments, the termination circuit comprises a first transistor that performs a switching operation in response to a first termination resistance control signal, and comprises a first terminal receiving a termination voltage, and a variable termination resistor coupled between the command/address bus and a second terminal of the first transistor, and having a resistance that is varied in response to a second termination resistance control signal.

In certain embodiments, the termination circuit comprises a first transistor that performs a switching operation in response to a first termination resistance control signal, and comprises a first terminal that receives a termination voltage, and a first termination resistor comprising a first terminal connected to a second terminal of the first transistor. The termination circuit further comprises a second termination resistor comprising a first terminal connected to the second terminal of the first transistor, and a second transistor coupled between a second terminal of the first termination resistor and the command/address bus, and performing a switching operation in response to a second termination resistance control signal. The termination circuit still further comprises an inverter for inverting the second termination resistance control signal, and a third transistor coupled between a second terminal of the second termination resistor and the command/address bus, and performing a switching operation in response to an output signal of the inverter.

In certain embodiments, the termination circuit comprises a fuse control circuit configured to generate a fuse control signal in response to the termination resistance control signal, a termination resistor having a first terminal connected to the command/address bus, and a fuse coupled between a second terminal of the termination resistor and a termination voltage, the fuse being cut off in response to the fuse control signal.

In certain embodiments, each of the semiconductor memory devices comprises a pin for electrically connecting a corresponding termination circuit to the command/address bus.

In certain embodiments, each of the semiconductor memory devices comprises a termination circuit for a data bus through which the data signal is transmitted.

According to another embodiment of the inventive concept, a memory system comprises a memory controller that generates a command/address signal, a data signal and a termination resistance control signal, and a memory module comprising a plurality of semiconductor memory devices configured to operate in response to the command/address signal, the data signal and the termination resistance control signal, each of the semiconductor memory devices comprising a termination circuit for a command/address bus through which the command/address signal is transmitted.

In certain embodiments, the command/address has a fly-by structure, and electrically connects the semiconductor memory devices to each other.

In certain embodiments, at least one of the termination circuits included in the plurality of semiconductor memory devices is configured to change a termination resistance of the command/address bus in response to the termination resistance control signal.

In certain embodiments, at least one of the semiconductor memory devices comprises a pin for electrically connecting each of termination circuits included in each of the semiconductor memory devices to the command/address bus.

In certain embodiments, each of the semiconductor memory devices comprises a termination circuit for a data bus through which the data signal is transmitted.

According to still another embodiment of the inventive concept, a memory system comprises a memory controller configured to generate a command/address signal, a data signal and a termination resistance control signal, and a memory module section comprising a plurality of semiconductor memory devices configured to operate in response to the command/address signal, the data signal and the termination resistance control signal, each of the semiconductor devices comprising a termination circuit for a command/address bus through which the command/address signal is transmitted.

In certain embodiments, the memory module section comprises a plurality of memory modules that operate in response to the command/address signal, the data signal, and the termination resistance control signal.

In certain embodiments, each of the memory modules is configured to have a different termination resistance based on various operation modes.

In certain embodiments, at least one of the termination circuits is turned off while a corresponding memory module performs a read operation, and at least one of the termination circuits is turned on while a corresponding memory module does not perform a read operation.

In certain embodiments, at least one of the termination circuits is turned off while a corresponding memory module performs a write operation, and at least one of the termination circuits is turned on while a corresponding memory module does not perform a write operation.

BRIEF DESCRIPTION OF THE DRAWINGS

The drawings illustrate various embodiments of the inventive concept. In the drawings, like reference numbers indicate like features. In addition, certain aspects of the drawings may be exaggerated for clarity.

DETAILED DESCRIPTION OF EMBODIMENTS

Various embodiments of the inventive concept are described below with reference to the accompanying drawings. These embodiments are presented as teaching examples and should not be construed to limit the scope of the inventive concept.

In the description that follows, the terms first, second, etc., are used to describe various elements, but these elements should not be limited by these terms. Rather, these terms are only used to distinguish one element from another. For example, a first element could be termed a second element, and, similarly, a second element could be termed a first element, without departing from the scope of example embodiments. As used herein, the term "and/or" encompasses any and all combinations of one or more of the associated listed items.

Where an element is referred to as being "connected" or "coupled" to another element, it can be directly connected or coupled to the other element or intervening elements may be present. However, where an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to limit the embodiments. As used herein, the singular forms "a," "an" and "the" are intended to encompass plural forms as well, unless the context clearly indicates otherwise. The terms "comprises," "comprising," "includes" and/or "including," where used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper" and the like, may be used herein for ease of description to describe one element or a relationship between a feature and another element or feature as illustrated in the figures. The spatially relative terms are intended to encompass different orientations of the device in use or operation in addition to the orientation depicted in the Figures. For example, where the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Figure 1:
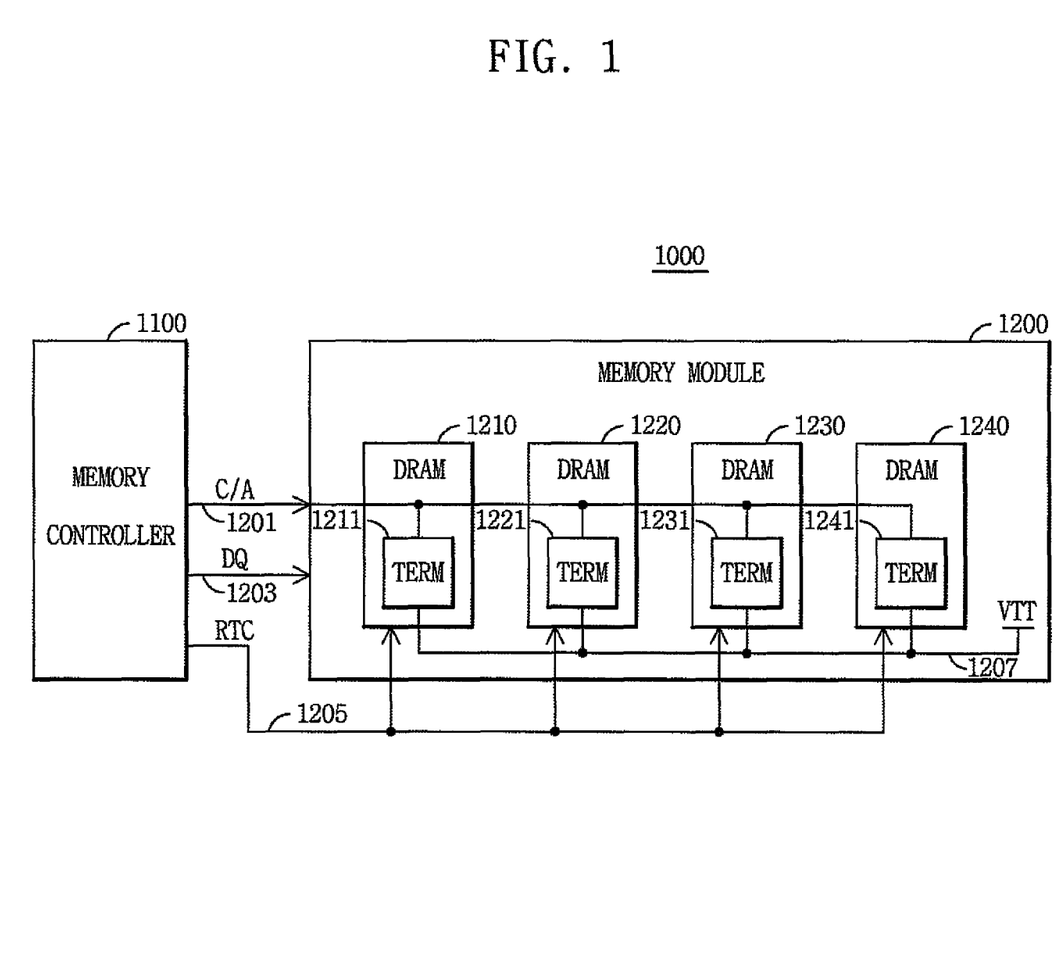
FIG. 1 is a block diagram of a memory system according to an embodiment of the inventive concept.

FIG. 1 is a block diagram of a memory system 1000 according to an embodiment of the inventive concept.

Referring to FIG. 1, memory system 1000 comprises a memory controller 1100 and a memory module 1200.

Memory controller 1100 generates a command/address signal C/A, a data signal DQ, and a termination resistance control signal RTC, and provides these signals to control memory module 1200 via a command/address bus 1201, a data bus 1203, and a control signal bus 1205, respectively.

Memory module 1200 comprises a plurality of semiconductor memory devices 1210, 1220, 1230 and 1240 comprising respective termination circuits 1211, 1221, 1231 or 1241 for command/address bus 1201. Command/address signal C/A comprises packet data comprising a command signal and an address signal.

Although FIG. 1 shows memory module 1200 with four semiconductor memory devices, memory module 1200 can comprise any number of semiconductor memory devices. Moreover, the semiconductor memory devices can be mounted on both sides of a substrate of memory module 1200.

Data signal DQ is transmitted between memory controller 1100 and semiconductor memory devices 1210, 1220, 1230 and 1240 through data bus 1203. Termination resistance control signal RTC is provided to semiconductor memory devices 1210, 1220, 1230 and 1240 through control signal bus 1205.

Command/address bus 1201 has a fly-by structure, and electrically connects semiconductor memory devices 1210, 1220, 1230 and 1240 to each other. Each of termination circuits 1211, 1221, 1231 and 1241 is coupled between command/address bus 1201 and a termination voltage VTT, and changes a termination resistance of command/address bus 1201 in response to termination resistance control signal RTC as explained below. Termination voltage VTT is provided to termination circuits 1211, 1221, 1231 and 1241 through a conduction line 1207.

FIGS. 2 through 6 are circuit diagrams illustrating various embodiments of termination circuit 1211 in semiconductor memory device 1210. These embodiments are designated as termination circuits 1211a through 1211e. Termination circuits 1221, 1231 and 1241 can take the same form as the embodiments of termination circuit 1211.

Figure 2:
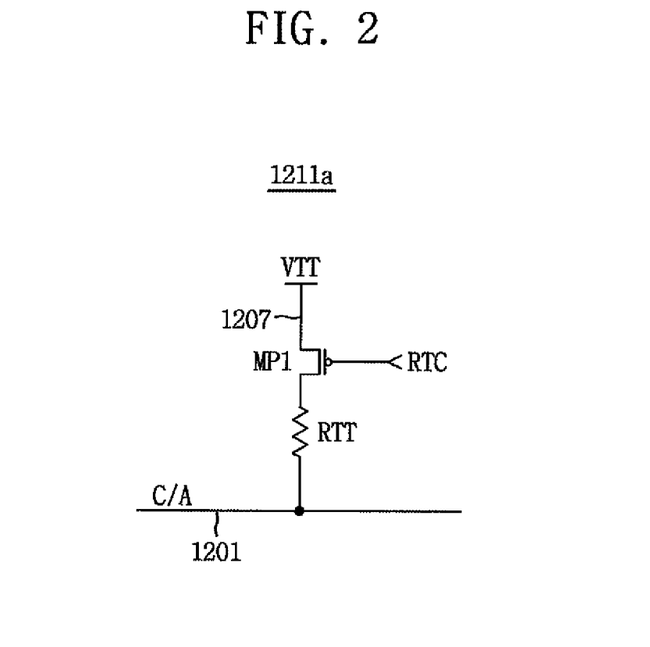
FIGS. 2 through 6 are circuit diagrams illustrating various embodiments of a termination circuit included in a semiconductor memory device within a memory module shown in FIG. 1.

Referring to FIG. 2, termination circuit 1211a comprises a termination resistor RTT and a PMOS transistor MP1. Termination resistor RTT comprises a first terminal connected to command/address bus 1201. PMOS transistor MP1 is coupled between a second terminal of termination resistor RTT and termination voltage VTT, and performs a switching operation in response to termination resistance control signal RTC. Termination voltage VTT is provided to a source of PMOS transistor MP1 through conduction line 1207.

Figure 3:
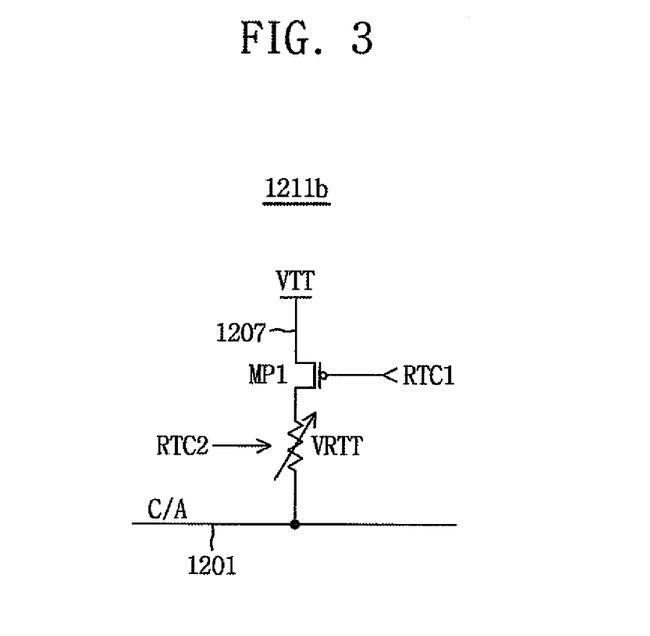

Referring to FIG. 3, termination circuit 1211b comprises a PMOS transistor MP1 and a variable termination resistor VRTT. PMOS transistor MP1 comprises a first terminal that receives termination voltage VTT and performs a switching operation in response to a first termination resistance control signal RTC1. Variable termination resistor VRTT is coupled between command/address bus 1201 and a second terminal of PMOS transistor MP1, and has resistance that is varied in response to a second termination resistance control signal RTC2. Termination voltage VTT is provided to a source of PMOS transistor MP1 through conduction line 1207.

Figure 4:
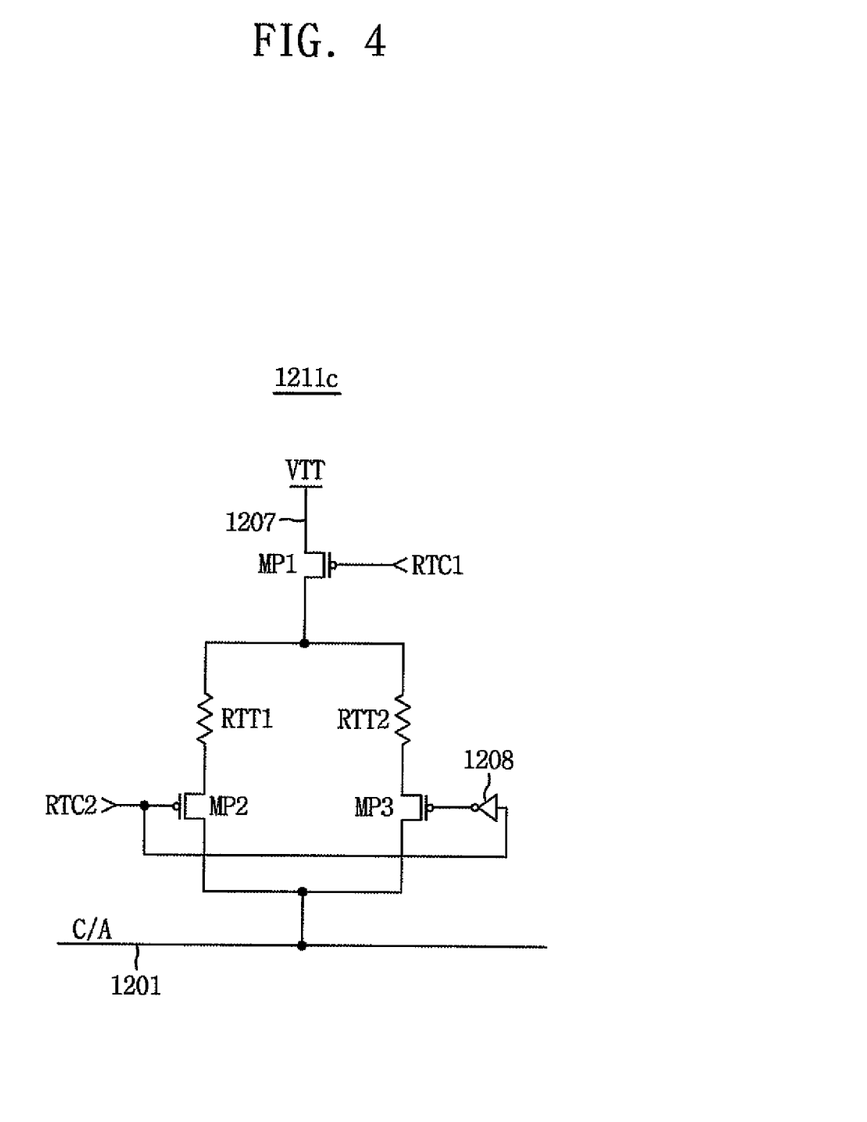

Referring to FIG. 4, termination circuit 1211c comprises a first PMOS transistor MP1, a first termination resistor RTT1, a second termination resistor RTT2, a second PMOS transistor MP2, an inverter 1208 and a third PMOS transistor MP3.

First PMOS transistor MP1 comprises a first terminal that receives termination voltage VTT and performs a switching operation in response to a first termination resistance control signal RTC 1. A first terminal of first termination resistor RTT 1 and a first terminal of second termination resistor RTT2 are coupled to a second terminal of first PMOS transistor MP1. Second PMOS transistor MP2 is coupled between a second terminal of first termination resistor RTT1 and command/address bus 1201, and performs a switching operation in response to a second termination resistance control signal RTC2. Inverter 1208 inverts second termination resistance control signal RTC2. Third PMOS transistor MP3 is coupled between a second terminal of second termination resistor RTT2 and command/address bus 1201, and performs switching operation in response to an output signal of inverter 1208.

In FIGS. 2 through 4, termination resistance control signal RTC, first termination resistance control signal RTC1, and second termination resistance control signal RTC2 can comprise a mode register set signal (MRS) that determines operation modes of a semiconductor memory device.

Figure 5:
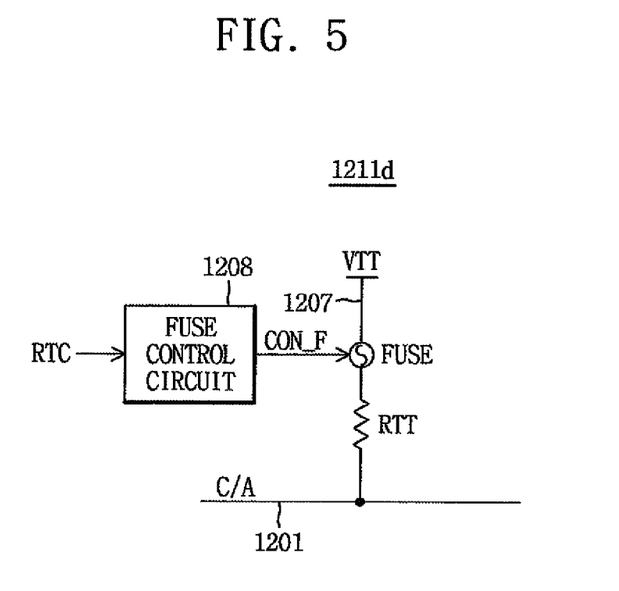

Referring to FIG. 5, termination circuit 1211d comprises a termination resistor RTT, a fuse control circuit 1208, and a fuse.

Fuse control circuit 1208 generates a fuse control signal CON_F based on termination resistance control signal RTC. Termination resistor RTT comprises a first terminal connected to command/address bus 1201. The fuse is coupled between a second terminal of termination resistor RTT and termination voltage VTT, and is cut off in response to fuse control signal CON_F. Termination voltage VTT is provided to the fuse through conduction line 1207. Fuse control signal CON_F typically comprises a high voltage signal.

Figure 6:
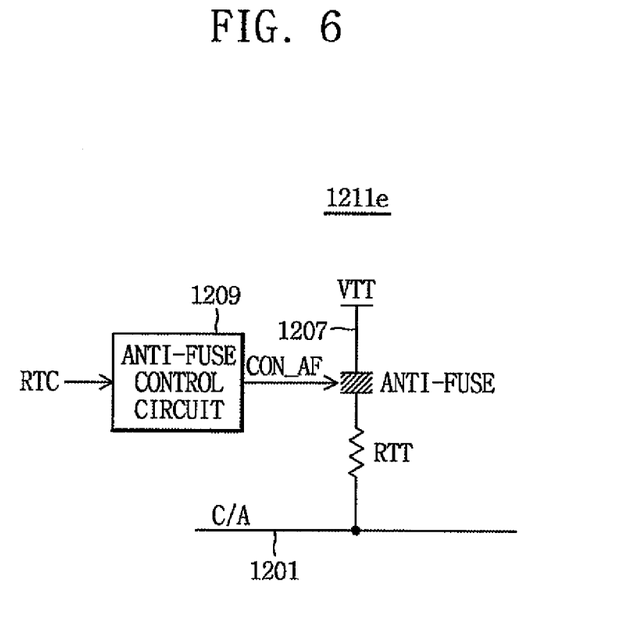

Referring to FIG. 6, termination circuit 1211e comprises a termination resistor RTT, an anti-fuse control circuit 1209, and an anti-fuse.

Anti-fuse control circuit 1209 generates an anti-fuse control signal CON_AF based on termination resistance control signal RTC. Termination resistor RTT comprises a first terminal connected to command/address bus 1201. The anti-fuse is coupled between a second terminal of termination resistor RTT and termination voltage VTT, and is shorted in response to the anti-fuse control signal CON_AF. Termination voltage VTT is provided to the anti-fuse through conduction line 1207.

The anti-fuse functions as a capacitor and has a relatively high resistance, such as 10 MΩ, when the anti-fuse is not programmed. However, the anti-fuse has a relatively low resistance, such as 200~500Ω, when the anti-fuse is programmed.

Figure 7:
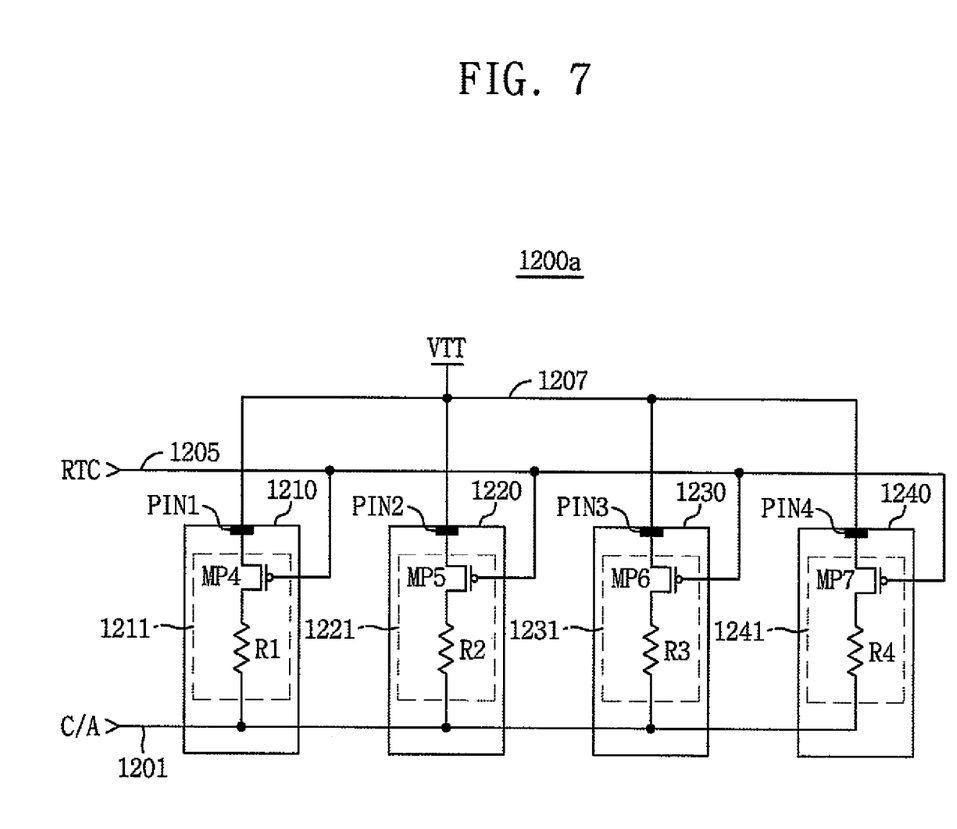
FIGS. 7 through 9 are circuit diagrams illustrating various embodiments of a memory module included in the memory system of FIG. 1.
Figure 8:
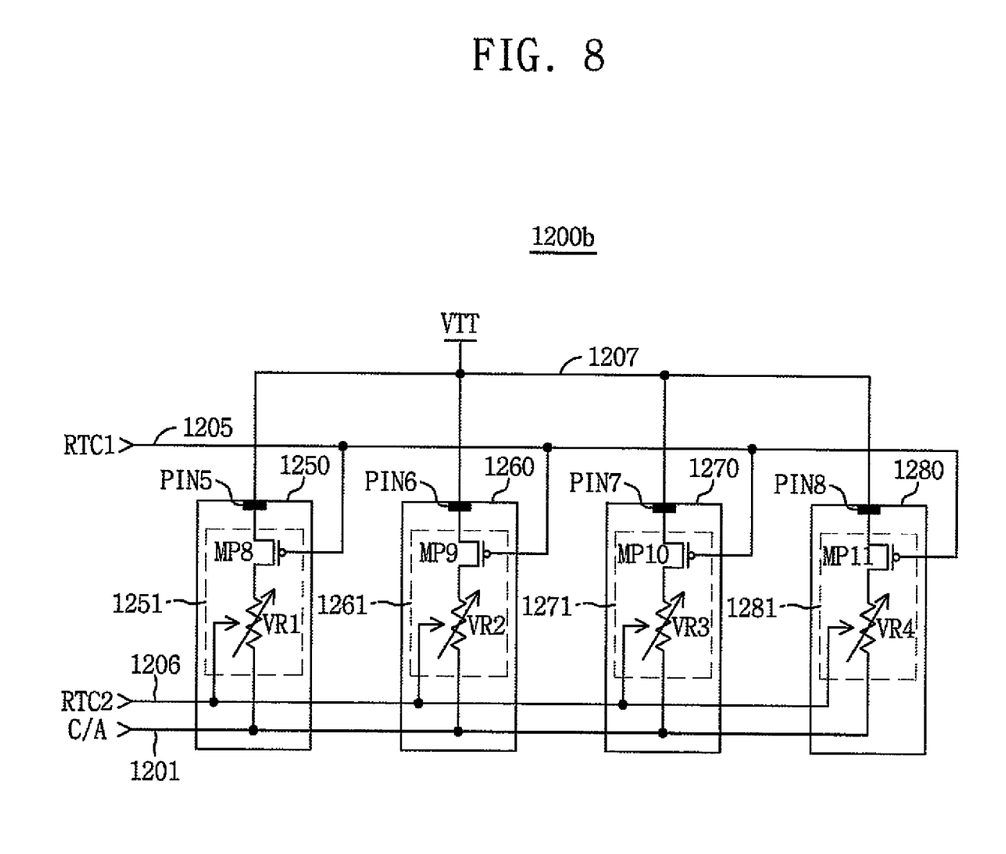
Figure 9:
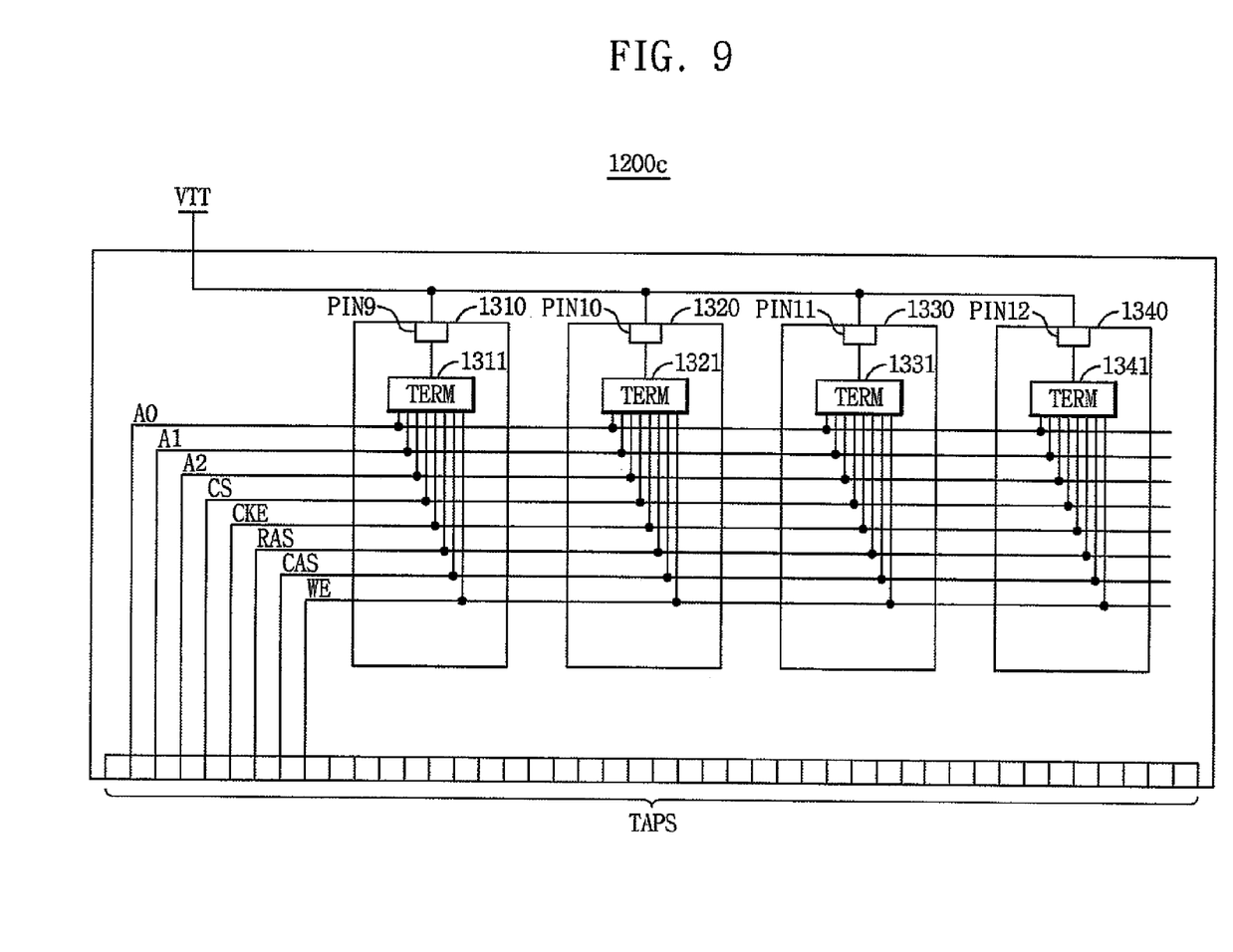

FIGS. 7 through 9 are circuit diagrams illustrating various embodiments of memory module 1200 of FIG. 1. These embodiments are designated as memory modules 1200a through 1200c.

Referring to FIG. 7, memory module 1200a comprises semiconductor memory devices 1210, 1220, 1230 and 1240.

Semiconductor memory devices 1210, 1220, 1230 and 1240 are coupled to command/address bus 1201 in a fly-by form, and comprise respective termination circuits 1211, 1221, 1231 or 1241 and pins PIN1, PIN2, PIN3 or PIN4. Termination voltage VTT is provided to termination circuits 1211, 1221, 1231 or 1241 through conduction line 1207 and respective pins PIN1, PIN2, PIN3 or PIN4.

Termination circuit 1211 comprises a termination resistor R1 comprising a first terminal connected to command/address bus 1201, and a PMOS transistor MP4 coupled between a second terminal of the termination resistor R1 and termination voltage VTT. PMOS transistor MP4 operates in response to termination resistance control signal RTC.

Termination circuit 1221 comprises a termination resistor R2 comprising a first terminal connected to command/address bus 1201, and a PMOS transistor MP5 coupled between a second terminal of the termination resistor R2 and termination voltage VTT. PMOS transistor MP5 operates in response to termination resistance control signal RTC.

Termination circuit 1231 comprises a termination resistor R3 having a first terminal connected to command/address bus 1201, and a PMOS transistor MP6 coupled between a second terminal of the termination resistor R3 and termination voltage VTT. PMOS transistor MP6 operates in response to termination resistance control signal RTC.

Termination circuit 1241 comprises a termination resistor R4 comprising a first terminal connected to command/address bus 1201, and a PMOS transistor MP7 coupled between a second terminal of termination resistor R4 and termination voltage VTT. PMOS transistor MP7 operates in response to termination resistance control signal RTC.

Each of termination circuits 1211, 1221, 1231 or 1241 is coupled between command/address bus 1201 and termination voltage VTT, and changes the termination resistance of command/address bus 1201 in response to termination resistance control signal RTC.

Memory module 1200a of FIG. 7 can turn on all of termination circuits 1211, 1221, 1231 and 1241 to change termination resistance of command/address bus 1201 in response to termination resistance control signal RTC. Alternatively, memory module 1200a of FIG. 7 can turn on only termination circuit 1241 of semiconductor memory device 1240 and turn off the remaining termination circuits 1211, 1221 and 1231 to change termination resistance of command/address bus 1201. Further, memory module 1200a of FIG. 7 can turn on termination circuits 1221 and 1241 of semiconductor memory devices 1220 and 1240, which may be semiconductor memory devices having low signal integrity among semiconductor memory devices 1210, 1220, 1230 and 1240, and turn off the remaining termination circuits 1211 and 1231 to change termination resistance of command/address bus 1201.

Referring to FIG. 8, memory module 1200b comprises semiconductor memory devices 1250, 1260, 1270 and 1280.

Semiconductor memory devices 1250, 1260, 1270 and 1280 are coupled to command/address bus 1201 in a fly-by form, and comprise respective termination circuits 1251, 1261, 1271 or 1241, and respective pins PIN5, PIN6, PIN7 or PIN8. Termination voltage VTT is provided to termination circuits 1251, 1261, 1271 or 1281 through conduction line 1207 and respective pins PIN5, PIN6, PIN7 or PIN8.

Termination circuit 1251 comprises a variable termination resistor VR1 comprising a first terminal connected to command/address bus 1201, and a PMOS transistor MP8 coupled between a second terminal of the variable termination resistor VR1 and termination voltage VTT. PMOS transistor MP8 operates in response to first termination resistance control signal RTC1. The resistance of variable termination resistor VR1 changes in response to the second termination resistance control signal RTC2.

Termination circuit 1261 comprises a variable termination resistor VR2 comprising a first terminal connected to command/address bus 1201, and a PMOS transistor MP9 coupled between a second terminal of the variable termination resistor VR2 and termination voltage VTT. PMOS transistor MP9 operates in response to the first termination resistance control signal RTC1. The resistance of variable termination resistor VR2 changes in response to second termination resistance control signal RTC2.

Termination circuit 1271 comprises a variable termination resistor VR3 comprising a first terminal connected to command/address bus 1201, and a PMOS transistor MP10 coupled between a second terminal of variable termination resistor VR3 and termination voltage VTT. PMOS transistor MP10 operates in response to first termination resistance control signal RTC1. The resistance of variable termination resistor VR3 changes in response to second termination resistance control signal RTC2.

Termination circuit 1281 comprises a variable termination resistor VR4 comprising a first terminal connected to command/address bus 1201, and a PMOS transistor MP11 coupled between a second terminal of variable termination resistor VR4 and termination voltage VTT. PMOS transistor MP11 operates in response to the first termination resistance control signal RTC1. The resistance of variable termination resistor VR4 changes in response to second termination resistance control signal RTC2.

Each of termination circuits 1251, 1261, 1271 or 1281 is coupled between command/address bus 1201 and termination voltage VTT, and changes the termination resistance of command/address bus 1201 in response to first termination resistance control signal RTC1 and second termination resistance control signal RTC2.

Memory module 1200b of FIG. 8 can turn on all of termination circuits 1251, 1261, 1271 and 1281 to change the termination resistance of command/address bus 1201 in response to first termination resistance control signal RTC1. Alternatively, memory module 1200b can turn on only termination circuit 1281 of semiconductor memory device 1280 and turn off the remaining termination circuits 1251, 1261 and 1271 to change the termination resistance of command/address bus 1201. Further, memory module 1200b can turn on termination circuits 1261 and 1281, which may be semiconductor memory devices having a low signal integrity among the semiconductor memory devices 1250, 1260, 1270 and 1280, and turn off the remaining termination circuits 1251 and 1271 to change termination resistance of command/address bus 1201.

Memory module 1200c of FIG. 9 illustrates an example of a memory module where command/address signal C/A is transmitted as discrete signals rather than a signal having a packet form. Memory module 1200c of FIG. 9 has a structure that terminates eight buses used to transmit address signals A0, A1 and A2, a chip selecting signal CS, a clock enable signal CKE, a row address strobe signal RAS, a column address strobe signal CAS, and a write enable signal WE.

Referring to FIG. 9, memory module 1200c comprises semiconductor memory devices 1310, 1320, 1330 and 1340, and communicates with external devices through taps.

Semiconductor memory devices 1310, 1320, 1330 and 1340 are coupled to buses for command/address signals A0, A1, A2, CS, CKE, RAS, CAS and WE in a fly-by form, and comprise respective termination circuits 1311, 1321, 1331 or 1341 and respective pins PIN9, PIN10, PIN11, and PIN12. Termination voltage VTT is provided to termination circuits 1311, 1321, 1331 or 1341 through respective pins PIN9, PIN10, PIN11 or PIN12 included in semiconductor memory devices 1310, 1320, 1330 and 1340. Termination circuits 1311, 1321, 1331, and 1341 can have circuit structures similar to those shown in FIGS. 2 through 5.

Each of termination circuits 1311, 1321, 1331 or 1341 is coupled between the buses for command/address signals A0, A1, A2, CS, CKE, RAS, CAS and WE, and termination voltage VTT, and changes termination resistance of the buses for the command/address signals A0, A1, A2, CS, CKE, RAS, CAS and WE in response to a termination resistance control signal.

Memory module 1200c of FIG. 9 can turn on all of termination circuits 1311, 1321, 1331 and 1341 in semiconductor memory devices 1310, 1320, 1330 and 1340 to the change termination resistance of the buses for command/address signals A0, A1, A2, CS, CKE, RAS, CAS and WE. Alternatively, memory module 1200c of FIG. 9 can turn on only termination circuit 1341 in semiconductor memory device 1340 and turn off the other termination circuits 1311, 1321 and 1331 to change the termination resistance of the buses for command/address signals A0, A1, A2, CS, CKE, RAS, CAS and WE. Further, memory module 1200c of FIG. 9 can turn on termination circuits 1321 and 1341 of semiconductor memory devices 1320 and 1340, which may be semiconductor memory devices having a low signal integrity among semiconductor memory devices 1310, 1320, 1330 and 1340, and turn off the other termination circuits 1311 and 1331 to change termination resistance of the buses for command/address signals A0, A1, A2, CS, CKE, RAS, CAS and WE.

Figure 10:
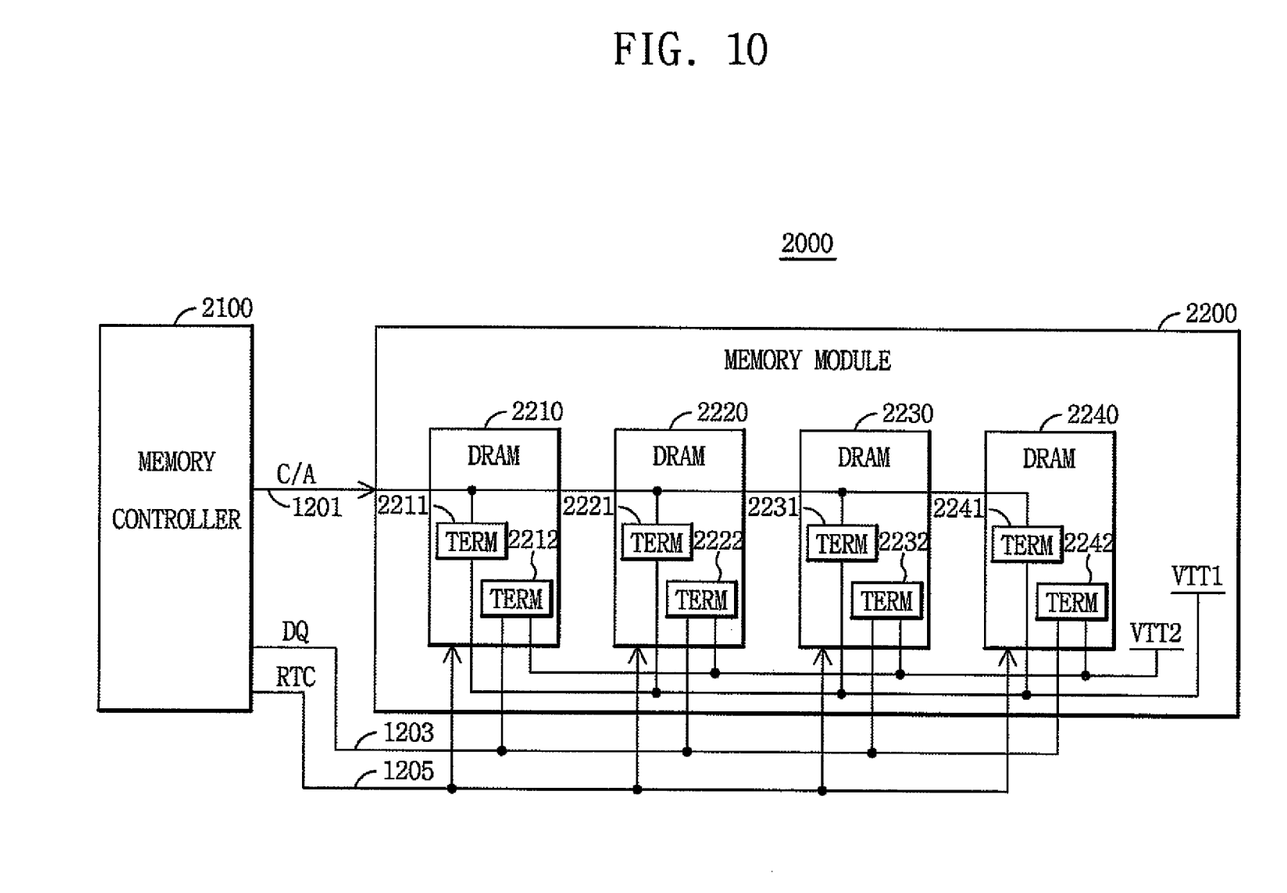
FIG. 10 is a block diagram of a memory system according to another embodiment of the inventive concept.

FIG. 10 is a block diagram of a memory system 2000 according to another embodiment of the inventive concept.

Referring to FIG. 10, memory system 2000 comprises a memory controller 2100 and a memory module 2200.

Memory controller 2100 generates command/address signal C/A, data signal DQ and termination resistance control signal RTC. Memory module 2200 operates in response to command/address signal C/A, data signal DQ and termination resistance control signal RTC.

Memory module 2200 comprises a plurality of semiconductor memory devices 2210, 2220, 2230 and 2240. Each of semiconductor memory devices 2210, 2220, 2230 and 2240 comprises a termination circuit 2211, 2221, 2231 or 2241 for command/address bus 1201, through which command/address signal C/A is transmitted. Command/address signal C/A comprises a packet in which a command signal and an address signal. Further, semiconductor memory devices 2210, 2220, 2230 and 2240 comprise respective termination circuits 2212, 2222, 2232 and 2242 for data bus 1203, through which data signal DQ is transmitted.

Although FIG. 10 shows memory module 2200 with four semiconductor memory devices, memory module 2200 can comprise any number of semiconductor memory devices. Moreover, semiconductor memory devices can be mounted on both sides of a substrate of memory module 2200.

Data signal DQ is transmitted between memory controller 2100 and semiconductor memory devices 2210, 2220, 2230 and 2240 through data bus 1203. Termination resistance control signal RTC is provided to semiconductor memory devices 2210, 2220, 2230 and 2240 through control signal bus 1205.

Command/address bus 1201 has a fly-by structure, and electrically connects semiconductor memory devices 2210, 2220, 2230 and 2240 to each other. Further, termination circuits 2211, 2221, 2231 and 2241 are coupled between command/address bus 1201 and a first termination voltage VTT1. Termination circuits 2211, 2221, 2231 and 2241 change a termination resistance of command/address bus 1201 in response to termination resistance control signal RTC. Further, each of termination circuit 2212, 2222, 2232 and 2242 are coupled between data bus 1203 and a second termination voltage VTT2, and change a termination resistance of data bus 1203 in response to termination resistance control signal RTC.

First termination voltage VTT1 is provided to each of termination circuits 2211, 2221, 2231 and 2241, and second termination voltage VTT2 is provided to each of termination circuits 2212, 2222, 2232 and 2242.

Memory system 2000 shown in FIG. 10 comprises a stub resistor in each of semiconductor memory devices 2210, 2220, 2230 and 2240 for impedance matching between command/address bus 1201 and each of semiconductor memory devices 2210, 2220, 2230 and 2240, and between data bus 1203 and each of semiconductor memory devices 2210, 2220, 2230 and 2240.

Figure 11:
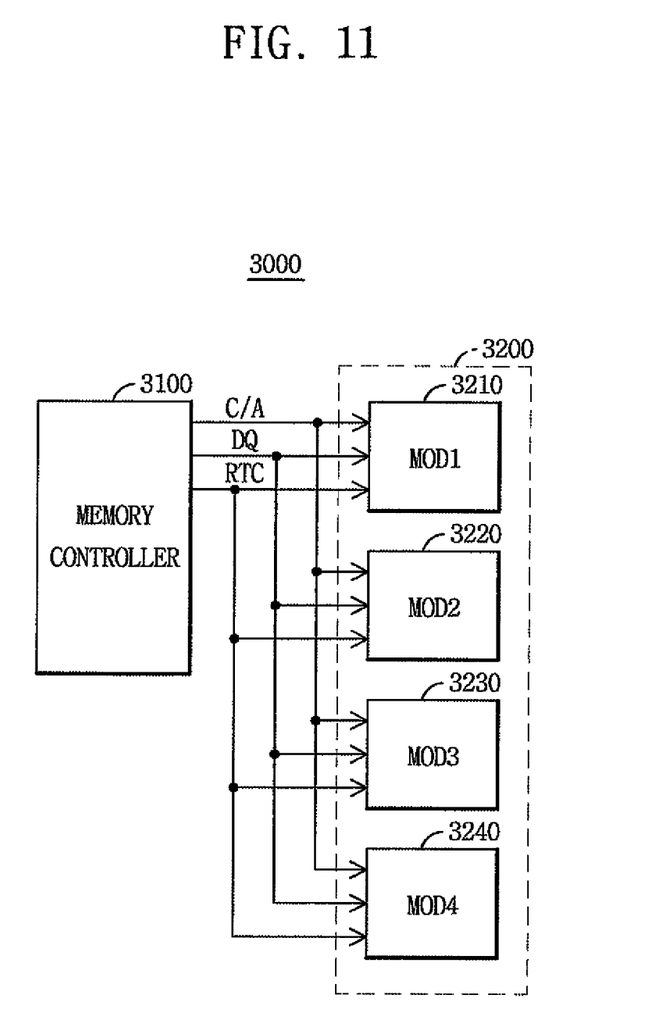
FIG. 11 is a block diagram of a memory system according to still another embodiment of the inventive concept.

FIG. 11 is a block diagram of a memory system 3000 according to still another embodiment of the inventive concept.

Referring to FIG. 11, memory system 3000 comprises a memory controller 3100 and a memory module section 3200.

Memory controller 3100 generates command/address signal C/A, data signal DQ and termination resistance control signal RTC. Memory module section 3200 comprises memory modules 3210, 3220, 3230 and 3240, which operate in response to command/address signal C/A, data signal DQ, and termination resistance control signal RTC. A plurality of semiconductor memory devices (not shown) are mounted on each of memory modules 3210, 3220, 3230 and 3240. Each of the semiconductor memory devices has a termination circuit for a command/address bus through which command/address signal C/A is transmitted. Command/address signal C/A typically comprises packet data comprising a command signal and an address signal. The termination circuit for the command/address bus can have a circuit structure similar to the embodiments of FIGS. 2 through 6.

FIG. 11 shows memory module section 3200 with four memory modules. However, memory module section 3200 can have any number of memory modules.

Data signal DQ is transmitted between memory controller 3100 and memory modules 3210, 3220, 3230 and 3240 through a data bus. Termination resistance control signal RTC is provided to memory modules 3210, 3220, 3230 and 3240 through a control signal bus.

The command/address bus has a fly-by structure, and electrically connects the semiconductor memory devices mounted of memory modules 3210, 3220, 3230 and 3240 to each other. Further, each of the termination circuits in the semiconductor memory devices of memory modules 3210, 3220, 3230 and 3240 is coupled between the command/address bus and termination voltage VTT, and changes a termination resistance of the command/address bus in response to termination resistance control signal RTC. Further, each of the semiconductor memory devices of memory modules 3210, 3220, 3230 and 3240 can comprise a termination circuit for changing the termination resistance of the data bus in response to termination resistance control signal RTC.

Where a termination circuit in memory system 3000 of FIG. 11 comprises PMOS transistor MP1 and variable termination resistor VRTT as shown in termination circuit 1211$b$ of FIG. 3, termination resistance control signal RTC can comprise first termination resistance control signal RTC1 and second termination resistance control signal RTC2.

Figure 12:
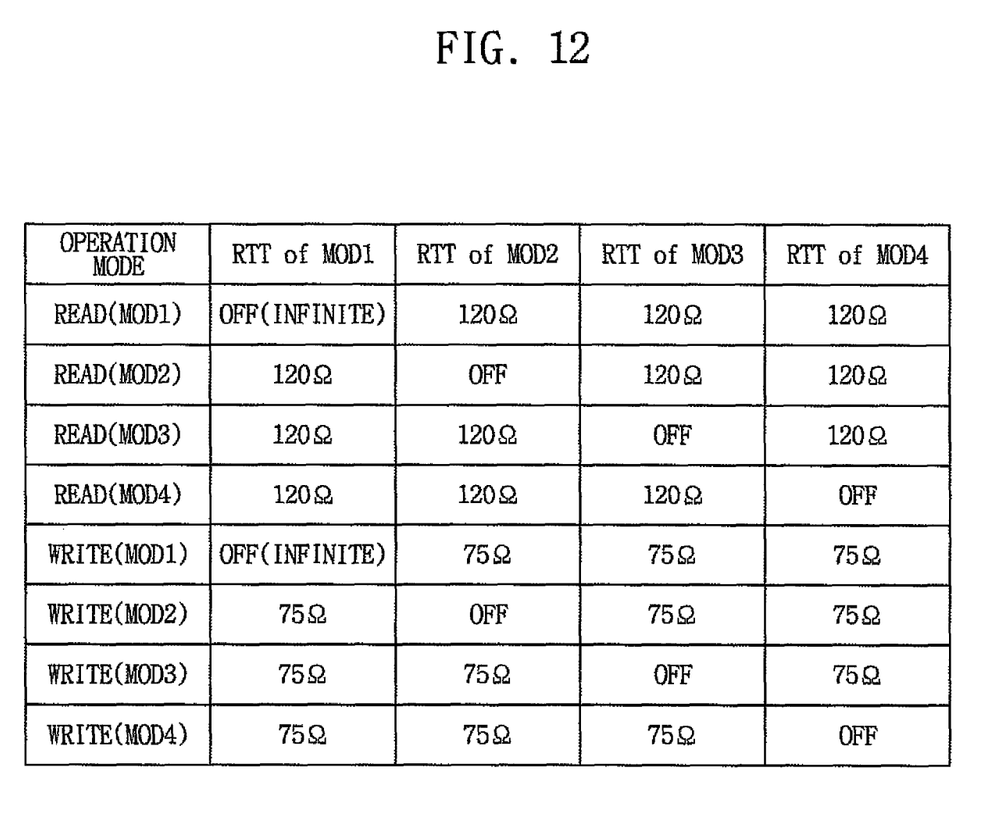
FIG. 12 is a table illustrating example termination resistances of a termination circuit in memory modules shown in FIG. 11.

FIG. 12 is a table illustrating example values of a termination resistance of a termination circuit in memory modules of the memory system of FIG. 11.

Referring to FIG. 12, in a memory system comprising first through fourth memory modules MOD1, MOD2, MOD3, and MOD4, each memory module has a different termination resistance in a read operation mode and in a write operation mode.

For example, where first memory module MOD1 is read out READ(MOD1), a termination resistor of first memory module MOD1 may have an infinite resistance because the termination resistor of the first memory module MOD1 is not electrically connected to termination voltage VTT, and each of second through fourth memory modules MOD2, MOD3 and MOD4 have a termination resistance of 120Ω. Where second memory module MOD2 is read out READ(MOD2), a termination resistor of second memory module MOD2 has an infinite resistance because the termination resistor of second memory module MOD2 is not electrically connected to termination voltage VTT, and each of first memory module MOD1, third memory module MOD3, and fourth memory module MOD4 has a termination resistance of 120Ω.

Further, where first memory module MOD1 is written in WRITE(MOD1), a termination resistor of first memory module MOD1 has an infinite resistance because the termination resistor of first memory module MOD1 is not electrically connected to termination voltage VTT, and each of second through fourth memory modules MOD2, MOD3 and MOD4 has a termination resistance of 75Ω. Where second memory module MOD2 is written in WRITE(MOD2), a termination resistor of first memory module MOD2 has an infinite resistance because the termination resistor of second memory module MOD2 is not electrically connected to termination voltage VTT, and each of first memory module MOD1, third memory module MOD3, and fourth memory module MOD4 has a termination resistance of 75Ω.

As indicated by the foregoing, a memory module and a memory system incorporating the memory module comprise a termination circuit for a command/address bus through which a command/address signal (C/A) is transmitted in each of multiple semiconductor memory devices included in the memory module. The termination circuits are turned on or turned off in response to a termination resistance control signal, and change a termination resistance according to an operation mode.

The memory module can provide improved performance and lower error rate compared with certain conventional memory modules due to the termination circuit. The termination circuit can also occupy less space compared with some alternative components used to reduce signal reflection. Accordingly, the termination circuit can allow the memory module to accommodate additional features, such as capacitors for decreasing power noise.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept.

Accordingly, all such modifications are intended to be included within the scope of the inventive concept as defined in the claims.

What is claimed is:

1. A memory module, comprising:
  a substrate;
  a plurality of semiconductor memory devices mounted on a surface of the substrate and configured to operate in response to a command/address signal, a data signal, and a termination resistance control signal;
  a command/address bus configured to transmit the command/address signal to the plurality of semiconductor memory devices; and
  a plurality of termination circuits formed in the respective semiconductor memory devices for termination of the command/address bus,
  wherein the termination circuit comprises:
  a first transistor that performs a switching operation in response to a first termination resistance control signal, and comprises a first terminal receiving a termination voltage; and
  a variable termination resistor coupled between the command/address bus and a second terminal of the first transistor, and having a resistance that is varied in response to a second termination resistance control signal.

2. The memory module of claim 1, wherein the command/address signal comprises packet data comprising a command signal and an address signal.

3. The memory module of claim 1, wherein the command/address bus has a fly-by structure and electrically connects the semiconductor memory devices to each other.

4. The memory module of claim 1, wherein one or more of the termination circuits is configured to change a termination resistance of the command/address bus in response to the termination resistance control signal.

5. The memory module of claim 1, wherein one or more of the termination circuits comprises:
  a termination resistor comprising a first terminal connected to the command/address bus, and a second terminal; and
  a first transistor coupled between the second terminal of the termination resistor and a termination voltage, the first transistor performing a switching operation in response to the termination resistance control signal.

6. A memory module, comprising:
  a substrate;
  a plurality of semiconductor memory devices mounted on a surface of the substrate and configured to operate in response to a command/address signal, a data signal, and a termination resistance control signal;
  a command/address bus configured to transmit the command/address signal to the plurality of semiconductor memory devices; and
  a plurality of termination circuits formed in the respective semiconductor memory devices for termination of the command/address bus,
  wherein the termination circuit comprises:
  a first transistor that performs a switching operation in response to a first termination resistance control signal, and comprises a first terminal that receives a termination voltage, and;
  a first termination resistor comprising a first terminal connected to a second terminal of the first transistor;
  a second termination resistor comprising a first terminal connected to the second terminal of the first transistor;
  a second transistor coupled between a second terminal of the first termination resistor and the command/address bus, and performing a switching operation in response to a second termination resistance control signal;
  an inverter for inverting the second termination resistance control signal; and
  a third transistor coupled between a second terminal of the second termination resistor and the command/address bus, and performing a switching operation in response to an output signal of the inverter.

7. A memory module, comprising:
  a substrate;
  a plurality of semiconductor memory devices mounted on a surface of the substrate and configured to operate in response to a command/address signal, a data signal, and a termination resistance control signal;
  a command/address bus configured to transmit the command/address signal to the plurality of semiconductor memory devices; and
  a plurality of termination circuits formed in the respective semiconductor memory devices for termination of the command/address bus,
  wherein the termination circuit comprises:
  a fuse control circuit configured to generate a fuse control signal in response to the termination resistance control signal;
  a termination resistor having a first terminal connected to the command/address bus; and
  a fuse coupled between a second terminal of the termination resistor and a termination voltage, the fuse being cut off in response to the fuse control signal.

8. The memory module of claim 1, wherein each of the semiconductor memory devices comprises a pin for electrically connecting a corresponding termination circuit to the command/address bus.

9. The memory module of claim 1, wherein each of the semiconductor memory devices comprises a termination circuit for a data bus through which the data signal is transmitted.

10. A memory system, comprising:
  a memory controller that generates a command/address signal, a data signal and a termination resistance control signal; and
  a memory module comprising a plurality of semiconductor memory devices configured to operate in response to the command/address signal, the data signal and the termination resistance control signal, each of the semiconductor memory devices comprising a termination circuit for a command/address bus through which the command/address signal is transmitted, wherein the termination circuit for the command/address bus comprises:

a first transistor that performs a switching operation in response to a first termination resistance control signal, and comprises a first terminal receiving a termination voltage; and a variable termination resistor coupled between the command/address bus and a second terminal of the first transistor, and having a resistance that is varied in response to a second termination resistance control signal.

11. The memory system of claim 10, wherein the command/address has a fly-by structure, and electrically connects the semiconductor memory devices to each other.

12. The memory system of claim 10, wherein at least one of the termination circuits included in the plurality of semiconductor memory devices is configured to change a termination resistance of the command/address bus in response to the termination resistance control signal.

13. The memory module of claim 10, wherein at least one of the semiconductor memory devices comprises a pin for electrically connecting each of termination circuits included in each of the semiconductor memory devices to the command/address bus.

14. The memory module of claim 10, wherein each of the semiconductor memory devices comprises a termination circuit for a data bus through which the data signal is transmitted.

15. A memory system, comprising:

a memory controller configured to generate a command/address signal, a data signal and a termination resistance control signal; and a memory module section comprising a plurality of semiconductor memory devices configured to operate in response to the command/address signal, the data signal and the termination resistance control signal, each of the semiconductor devices comprising a termination circuit for a command/address bus through which the command/address signal is transmitted, wherein the termination circuit for the command/address bus comprises:

a first transistor that performs a switching operation in response to a first termination resistance control signal, and comprises a first terminal receiving a termination voltage; and a variable termination resistor coupled between the command/address bus and a second terminal of the first transistor, and having a resistance that is varied in response to a second termination resistance control signal.

16. The memory system of claim 15, wherein the memory module section comprises a plurality of memory modules that operate in response to the command/address signal, the data signal, and the termination resistance control signal.

17. The memory system of claim 16, wherein each of the memory modules is configured to have a different termination resistance based on various operation modes.

18. The memory system of claim 16, wherein at least one of the termination circuits is turned off while a corresponding memory module performs a read operation, and at least one of the termination circuits is turned on while a corresponding memory module does not perform a read operation.

19. The memory system of claim 16, wherein at least one of the termination circuits is turned off while a corresponding memory module performs a write operation, and at least one of the termination circuits is turned on while a corresponding memory module does not perform a write operation.

* * * * *